(12) United States Patent
Czarnik et al.

(10) Patent No.: US 12,122,529 B2
(45) Date of Patent: Oct. 22, 2024

(54) PROPULSION ENGINE ASSEMBLIES PROVIDING ACCESS TO COMPONENTS WITHIN PROPULSOR CAVITIES

(71) Applicant: General Electric Company Polska sp. z o.o., Warsaw (PL)

(72) Inventors: Mirosław Czarnik, Warsaw (PL); Tomasz Edward Berdowski, Warsaw (PL); Paweł Zdrojewski, Nowa Wola (PL); Łukasz Maciej Janczak, Warsaw (DE); Maciej Grunwald, Warsaw (PL)

(73) Assignee: GENERAL ELECTRIC COMPANY POLSKA SP. Z O.O, Warsaw (PL)

( * ) Notice: Subject to any disclaimer, the term of this patent is extended or adjusted under 35 U.S.C. 154(b) by 169 days.

(21) Appl. No.: 17/381,360

(22) Filed: Jul. 21, 2021

(65) Prior Publication Data

US 2022/0055759 A1 Feb. 24, 2022

(30) Foreign Application Priority Data

Aug. 20, 2020 (PL) ............................ 435034

(51) Int. Cl.
| | | |
|---|---|---|
| *F02K 3/06* | (2006.01) | |
| *B64D 27/12* | (2006.01) | |
| *B64D 27/24* | (2006.01) | |
| *B64D 29/02* | (2006.01) | |
| *B64D 27/02* | (2006.01) | |
| *B64F 5/40* | (2017.01) | |

(52) U.S. Cl.
CPC ............ *B64D 29/02* (2013.01); *B64D 27/12* (2013.01); *B64D 27/24* (2013.01); *B64D 27/026* (2024.01); *B64F 5/40* (2017.01)

(58) Field of Classification Search
CPC ..... F02K 3/06; F02K 3/025; B64D 2027/005; B64D 2027/026; B64D 27/026; F01D 15/10; B64F 5/40
See application file for complete search history.

(56) References Cited

U.S. PATENT DOCUMENTS

| | | |
|---|---|---|
| 3,791,682 A | 2/1974 | Mitchell |
| 3,859,785 A | 1/1975 | Leto et al. |
| 5,595,474 A | 1/1997 | Girard |
| 6,729,140 B2 | 5/2004 | Care et al. |
| 8,113,005 B2 | 2/2012 | Gotz et al. |
| 8,519,555 B2 * | 8/2013 | Dooley .................... H02P 9/00 290/1 A |
| 9,038,398 B2 | 5/2015 | Suciu et al. |
| 9,097,134 B2 | 8/2015 | Ferch et al. |
| 9,103,226 B2 | 8/2015 | Van Der Ham et al. |
| 9,233,757 B2 | 1/2016 | James et al. |
| 9,917,490 B2 | 3/2018 | Lemmers et al. |
| 10,060,292 B2 | 8/2018 | Sawyers-Abbott |
| 10,801,410 B2 | 10/2020 | Roberge |
| 2006/0042083 A1 | 3/2006 | Baker et al. |
| 2008/0072572 A1 | 3/2008 | Beutin et al. |

(Continued)

*Primary Examiner* — Philip J Bonzell
(74) *Attorney, Agent, or Firm* — Dority & Manning, P.A.

(57) ABSTRACT

Propulsion engines and methods of accessing components within propulsor cavities of propulsion engines are disclosed. A propulsion engine includes an outer engine housing that includes a propulsor cavity located therein. The propulsor cavity is axially located between a low-pressure compressor and a fan of the propulsion engine. An electric converter is disposed within the propulsor cavity.

8 Claims, 6 Drawing Sheets

(56) References Cited

U.S. PATENT DOCUMENTS

| | | | |
|---|---|---|---|
| 2010/0084507 A1* | 4/2010 | Vauchel | F02C 7/04 244/1 N |
| 2010/0117569 A1 | 5/2010 | Trainer et al. | |
| 2012/0133150 A1* | 5/2012 | Dooley | F01D 15/10 290/1 A |
| 2014/0157752 A1* | 6/2014 | Hasel | F02C 3/107 60/226.1 |
| 2014/0157753 A1* | 6/2014 | Hasel | F02K 3/06 60/226.1 |
| 2014/0157754 A1* | 6/2014 | Hasel | F02C 3/107 60/226.1 |
| 2014/0157755 A1* | 6/2014 | Hasel | F02K 3/06 60/226.1 |
| 2014/0157756 A1* | 6/2014 | Hasel | F02K 3/06 60/226.1 |
| 2014/0157757 A1* | 6/2014 | Hasel | F02K 3/06 60/226.1 |
| 2014/0165534 A1* | 6/2014 | Hasel | F02C 3/107 415/122.1 |
| 2016/0039528 A1* | 2/2016 | Caruel | B64D 33/02 415/119 |
| 2018/0058243 A1 | 3/2018 | Auker et al. | |
| 2018/0354631 A1* | 12/2018 | Adibhatla | F02C 3/113 |
| 2021/0237891 A1* | 8/2021 | Boileau | B64D 29/08 |
| 2021/0262359 A1* | 8/2021 | Sidelkovskiy | H02K 7/116 |
| 2021/0396193 A1 | 12/2021 | Guillotel et al. | |

\* cited by examiner

PROPULSION ENGINE ASSEMBLIES PROVIDING ACCESS TO COMPONENTS WITHIN PROPULSOR CAVITIES

PRIORITY INFORMATION

The present application claims priority to Polish Patent Application Number P.435034 filed on Aug. 20, 2020.

FIELD

The present disclosure relates to propulsion engines including propulsor cavities and methods of accessing components within the propulsor cavities, and more specifically, to architecture of propulsion engine systems that allows for access to line-replaceable units within the propulsor cavities.

BACKGROUND

Certain propulsion engine components, such as electrical converters associated with an electrical machine (e.g., an electrical generator) within a propulsion engine may be desirable to enhance the capabilities of aircraft by eliminating the need for heavy and bulky energy storage devices on the aircraft. However, locating such components may present challenges, should there be a need to frequently replace or repair such components. Moreover, certain components, such as an electric converter or the like, may only be suited for certain areas of the propulsion engine to avoid exposure to high temperatures and pressures within the propulsion engine.

SUMMARY

According to an embodiment of the present disclosure, a propulsion engine having an outer engine housing that includes a propulsor cavity located therein. The propulsor cavity is axially located between a low-pressure compressor and a fan of the propulsion engine. An electric converter is disposed within the propulsor cavity.

According to another embodiment of the present disclosure, a method of accessing an electric converter disposed within a propulsor cavity within a propulsion engine includes rotating one or more fan blades disposed forward of a segmented inlet guide vane away from the segmented inlet guide vane; and removing at least a portion of a segmented flowpath structure, thereby exposing the electric converter within the propulsor cavity.

According to another embodiment, a propulsion engine includes a propulsor cavity radially within an inlet of the propulsion engine and axially defined between a low-pressure compressor and a first fan of the propulsion engine; an electric converter disposed within the propulsor cavity; a flowpath structure shaped to provide a core airflow to an inlet guide vane; and a splitter disposed radially outward of the inlet guide vane, the splitter defining an outer boundary of the core airflow and an inner boundary of a bypass airflow. The inlet guide vane is disposed behind the first fan, where the inlet guide vane directs the core airflow to the low-pressure compressor. The inlet guide vane, the splitter, and the flowpath structure are segmented such that at least partially aligning segments of the inlet guide vane, the splitter, and the flowpath structure may be removed from the propulsion engine to expose at least a portion of the electric converter.

According to another embodiment, a propulsion engine includes an electric converter, a core including compressor and combustion portions and an electric machine coupled to the electric converter. The electric converter is disposed proximal an inlet to the core and distal of the electric machine.

According to another embodiment, a method of accessing an electric converter disposed within a propulsor cavity within a propulsion engine is provided. The method includes first, accessing the electric converter including rotating one or more fan blades. Second, removing at least a portion of an outer engine housing, thereby exposing the electric converter within the propulsor cavity.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

DETAILED DESCRIPTION

The present disclosure generally relates to propulsion engines that have accessible propulsion cavities to facilitate access to certain components of the propulsion engine (e.g., a line-replaceable unit such as an electric converter), particularly when the propulsion engine is on-wing, as well as methods of accessing the propulsor cavity through a perimeter of the propulsion engine. More specifically, the present disclosure relates to propulsion engines with propulsor cavities shaped and sized to hold electric converters that are associated with and electrically coupled to an electric machine. For example, electric generators may be co-located with the electric converters or the electric generators may be located outside of a propulsor cavity, spaced-apart from the electric converters or located within a common perimeter. As such, it should be understood that an electric generator is one illustrative example of an electric machine and the terms "electric generator" and "electric machine" may be used interchangeably herein. A "perimeter" as this term is understood, may be defined by a nacelle or a cowling.

As used herein, the term "on-wing" means that at least a portion of a propulsion engine remains attached to the aircraft (e.g., attached to a wing of the aircraft) while a component (e.g., a line-replaceable unit) is accessed and serviced within the propulsion engine. The component may specifically be an electric converter electrically coupled to an electric generator. The electric converter is placed within a propulsor cavity of the propulsion engine, providing the electric converter with a relatively cool operating environment that maintains the efficiency of the electric converter compared to, for example, a core of the propulsion engine. The electric converter may be accessible within the propulsor cavity for on-wing servicing and access through a perimeter of the propulsion engine.

As used herein, "radially outward" or "distal" refers to the direction generally away from the axis of rotation of the propulsor engine. As used herein, "radially inward" or "proximal" refers to the direction generally toward the axis of rotation of the propulsor engine.

The propulsion engines described herein may be attached to one or more locations on an aircraft. For example, the propulsion engines described herein may be mounted to the wings of the aircraft, the fuselage of the aircraft, the empennage of the aircraft, and/or the like. In exemplary embodiments, the propulsion engine may be configured as a propfan (also known as an open rotor engine or an unducted fan). However, it should be appreciated, that the propulsion engine may be similarly configured as a turbine engine, a turbofan engine, a turbojet engine, or any other aircraft engine known in the field.

Figure 1:
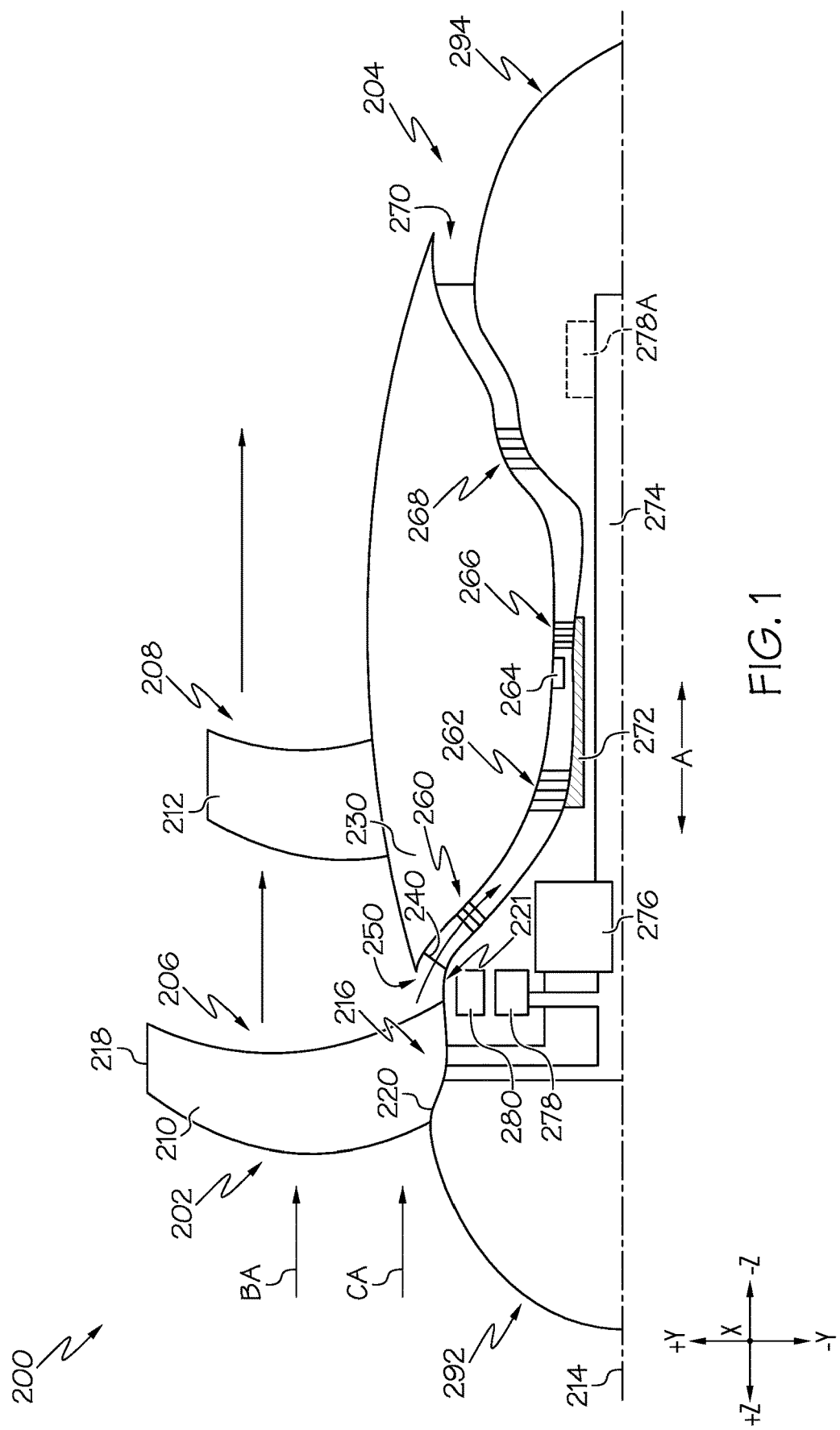
FIG. 1 depicts a cross sectional view of an illustrative propulsion engine of an aircraft, according to one or more embodiments shown and described herein.

Referring now to FIG. 1, a schematic cross-sectional view of a propulsion engine in accordance with an exemplary embodiment of the present disclosure is provided. In certain exemplary embodiments, the propulsion engine 200 may be configured as a propfan. A "propfan," may be referred to as an open rotor engine, or an unducted fan engine. As shown in FIG. 1, the propulsion engine 200 includes a fan section 202 and an exhaust section 204. In the embodiment depicted in FIG. 1, the fan section 202 is at a forward end 292 of the propulsion engine 200, and the exhaust section 204 is at a rear end 294 of the propulsion engine 200. The fan section 202 includes a plurality of separate rotor assemblies, or fans, including, but not limited to, a first rotor assembly 206 and a second rotor assembly 208, that are spaced apart from one another. More specifically, the first rotor assembly 206 is positioned forward (in the +z direction of the coordinate axes of FIG. 1) of the second rotor assembly 208. In some embodiments the first rotor assembly 206 and the second rotor assembly 208 are contra-rotating, or counter-rotating, assemblies. In such embodiments, the blades of the first rotor assembly 206 and the second rotor assembly 208 rotate about a common axis in opposite directions. For example, if the first rotor assembly 206 were to rotate clockwise with respect to the z axis of the coordinate axes of FIG. 1, the second rotor assembly 208 would rotate in the opposite direction, or counterclockwise, with the respect to the z axis of the coordinate axes of FIG. 1. In other embodiments, only one of the first rotor assembly 206 and second rotor assembly 208 rotates, in either a clockwise or counterclockwise direction and the non-rotating assembly remains stationary.

The first rotor assembly 206 and the second rotor assembly 208 each include an array of blades, 210 and 212, respectively. With reference to the first rotor assembly 206, the blades 210 include a root 216 and a tip 218. The root 216 is disposed radially inward from the tip 218, and is attached to a first rotor body 220. In embodiments, the array of blades may rotate around the axis extending from the root 216 to the tip 218. In embodiments in which one of the first rotor assembly 206 or the second rotor assembly 208 remain stationary, the blades of the stationary rotor assembly may be described as vanes. The vanes may be sized, shaped, and angled to decrease turbulence imparted to air travelling toward the rear end 294 of the propulsion engine 200. The stationary rotor assembly containing vanes may be positioned either forward or behind the rotating rotor assembly containing blades. In other words, either the first rotor assembly 206 or the second rotor assembly 208 may be stationary, as desired. The angle or pitch of the blades 210 and 212 may be adjusted by rotating the blades 210 and 212 about a pitch axis that extends through the root 216 and the tip of the blades 210.

In operation, the majority of air surrounding and encountered by the propulsion engine 200 is directed to the bypass airflow BA. The remaining air, or core airflow CA, is directed toward the core of the propulsion engine 200. The core airflow CA enters the core of the propulsion engine 200 at an inlet 250. The inlet 250 is the entrance point or pathway for the core airflow CA to enter the core of the propulsion engine 200. In other words, air that travels above a cowl compartment 230 is the bypass airflow BA, and air that travels beneath the cowl compartment 230 is the core airflow CA. At the mouth of the inlet 250, the core of the propulsion engine 200 includes inlet guide vanes 240, which will be described in further detail with reference to the following figures. The inlet guide vanes 240 may be adjusted to influence or control the amount and manner of core airflow CA entering the core of the propulsion engine 200. The core further includes a low-pressure compressor 260 and a high-pressure compressor 262 (collectively, a compressor portion), a combustion section 264 (e.g., a combustion portion), a high-pressure turbine 266, a low-pressure turbine 268, and an exhaust nozzle 270. A high-pressure shaft 272 connects the high-pressure turbine 266 to the high-pressure compressor 262, and a low-pressure shaft 274 connects the low-pressure turbine 268 to the low-pressure compressor 260.

The first rotor assembly 206 and the second rotor assembly 208 may be rotatable about the center longitudinal axis 214 by the low-pressure shaft 274. With reference to the first rotor assembly 206, the low-pressure shaft 274 may be mechanically coupled to the first rotor assembly 206 such that the low-pressure shaft 274 causes the first rotor body 220 and blades 210 attached thereto to rotate about the center longitudinal axis 214, generating thrust for the aircraft 10. In some embodiments, the low-pressure shaft 274 may be coupled to the first rotor assembly 206 and/or the second rotor assembly 208 by one or more gearboxes, such as a gearbox 276. Gearbox 276 may effectively function to adjust the speed at which the low-pressure shaft 274 rotates the first rotor assembly 206. For instance, gearbox 276 may include a plurality of gears for stepping down the rotational speed of the low-pressure shaft 274 to achieve an optimal rotation speed of the first rotor assembly 206. In some embodiments, the first rotor assembly 206 and/or the second rotor assembly 208 may operate without a gearbox. In such configurations, the rotor assemblies can be described as direct drive mechanisms. It should be noted that while a gas turbine engine is described as the drive mechanism of the rotor assemblies herein, in other embodiments, the rotor assemblies of the propulsion engine 200 may be rotated by an electric motor, an internal combustion engine, or any other suitable drive mechanism capable of providing torque and power to the rotor assemblies.

Still referring to FIG. 1, propulsion engine 200 includes an electric generator 278. The electric generator 278 may be rotatable with the first rotor assembly 206. Specifically, a rotor of the electric generator 278 is coupled to and rotatable with one of the rotating components of the propulsion engine 200.

The electrical power generated by the electric generator 278 may be output to the rest of the aircraft and/or the propulsion engine 200 as needed. The electric generator 278 may be electrically coupled to an electric converter 280 designed to convert the energy from the electric generator 278 to a more suitable or usable form of energy before providing the electric loads throughout the aircraft and/or propulsion engine 200. For instance, depending on the specific electric generator 278 included in the propulsion engine 200, the particular destination or use for the electric power generated, and circuitry or electric bus designed throughout the aircraft and propulsion engine 200, the electric converter 280 may be an AC/DC converter, a DC/AC converter, or a DC/DC converter. As will be discussed in greater detail below, the electric generator 278 may be co-located with the electric converter 280. In other embodiments, the electric generator 278A may be distanced from the electric converter 280, positioned elsewhere in the propulsion engine 200.

Figure 2:
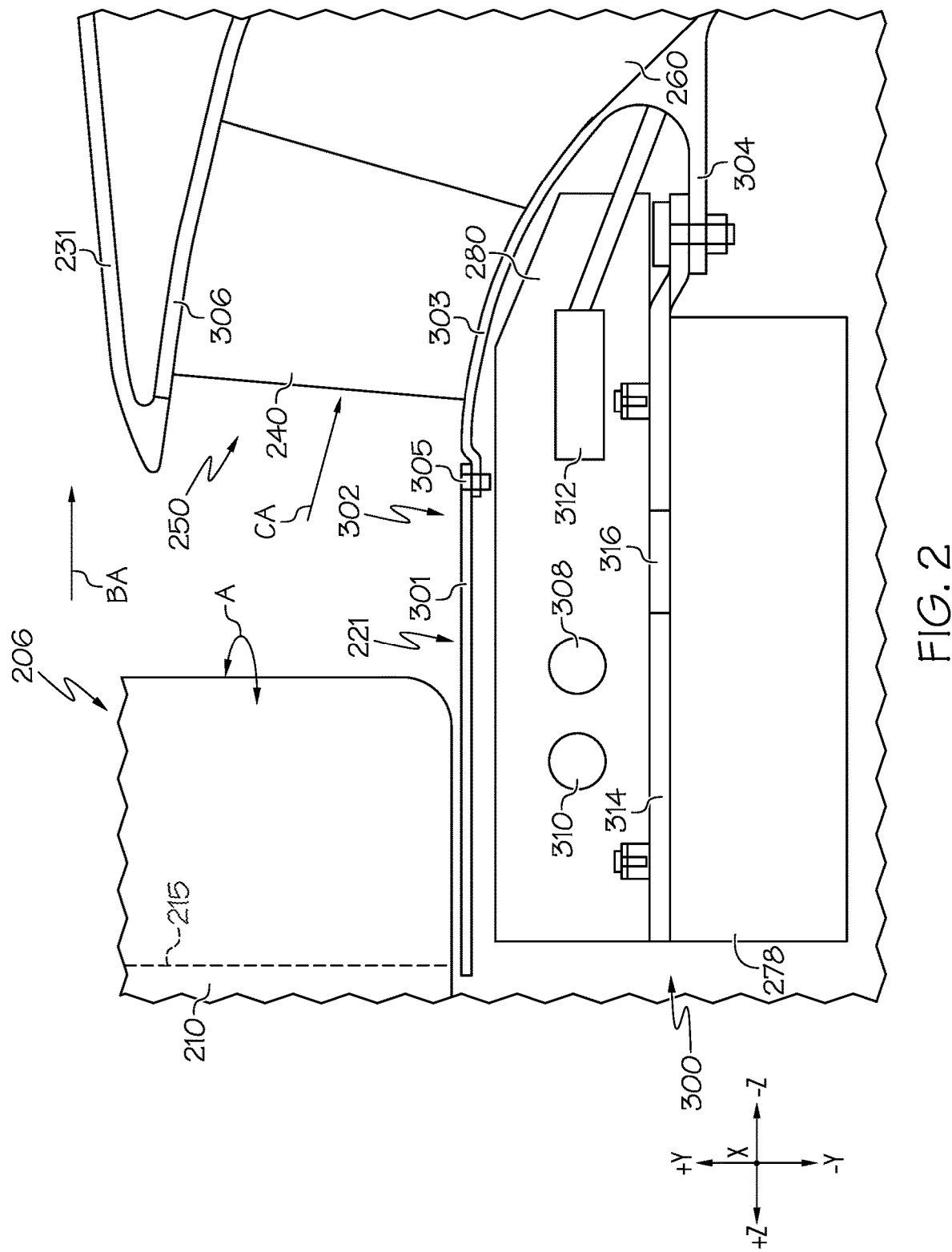
FIG. 2 depicts a cross sectional view of an illustrative propulsor cavity of the propulsion engine of FIG. 1, according to one or more embodiments shown and described herein.

Referring now to FIG. 2, a cross sectional view of the propulsion engine 200 (is provided. A flowpath structure 302, which may be part of an outer engine housing 221, extends from the inlet guide vanes 240 to the blade 210. In some embodiments, the flowpath structure 302 may comprise a forward portion 301 and a rear portion 303 positioned beneath the inlet guide vanes 240. The forward portion 301 and the rear portion 303 may be separably connected at a joint 305. The joint 305 may be a bolt, tie, or any other suitable fixation device. In such embodiments, the rear portion 303 may be integral with the inlet guide vanes 240. In other embodiments, the forward portion 301 and the rear portion 303 may be fixedly connected at the joint 305. In such embodiments, the flowpath structure 302 may be integral or separable from the inlet guide vanes 240. The flowpath structure 302 is aerodynamically contoured to effectively direct the core airflow CA into the core of the propulsion engine 200. Prior to entering the core, and more specifically, the low-pressure compressor 260, the core airflow CA is directed through the inlet guide vanes 240, which may be adjusted to further control the amount or rate of core airflow CA entering the core. The inlet guide vanes 240 are fixedly attached to an inlet guide vane housing 306, which defines the radially outward limit of the inlet guide vanes 240. Accordingly, the inlet guide vanes 240 are radially disposed between the inlet guide vane housing 306 and the flowpath structure 302, and more specifically, the rear portion 303 of the flowpath structure 302.

A propulsor cavity 300 is axially defined (e.g. in the z direction of the coordinate axes of FIG. 2) between the low-pressure compressor 260 and the first rotor assembly, or fan 206. The propulsor cavity 300 is disposed radially inside the outer engine housing 221, such as a nacelle, and radially outside the shaft 274. The inlet 250 circumferentially surrounds at least a portion of the propulsor cavity 300. In some embodiments, the propulsor cavity 300 may be radially within the flowpath structure 302 or another engine structure, such that the flowpath structure 302 or another engine structure circumferentially encloses at least a portion of the propulsor cavity 300. As explained above, the inlet 250 is the entrance point for the air that makes up the core airflow CA to enter the core of the propulsion engine. The inlet 250 may include at least a portion of a splitter 231 (described in further detail below), the inlet guide vanes 240, the inlet guide vane housing 306 (FIG. 2), and/or the flowpath structure 302, all of which at least partially define the entrance pathway for the core airflow CA to enter the core of the propulsion engine. Therefore, with reference to FIGS. 1 and 2, the propulsor cavity 300 is generally positioned toward the forward end 292 of the propulsion engine 200. As such, the propulsor cavity 300 is spaced-apart from the high-pressure compressor 262 and the combustion section 264, effectively shielding the interior of the propulsor cavity 300 from the relatively high temperatures and relatively high pressures generated deeper (in the −z direction of the coordinate axes of FIGS. 1 and 2) in the propulsion engine 200.

Referring again to FIG. 2, the splitter 231 of the cowl compartment 230 is depicted in more detail. The splitter 231 contacts the inlet guide vane housing 306, preventing the core airflow CA or bypass airflow BA from flowing between the splitter 231 and the inlet guide vane housing 306. Accordingly, all airflow that is directed beneath the splitter 231 encounters the inlet guide vanes 240 and is directed toward the core of the propulsion engine 200. All airflow that is directed above the splitter 231 becomes the bypass airflow BA. The splitter 231 defines the boundary between the bypass airflow BA and the core airflow CA, where the core airflow CA is directed toward the low-pressure compressor 260 and the bypass airflow BA is directed over the cowl compartment 230.

The splitter 231 may be segmented into circumferential sections such that segments of the splitter 231 can be individually removed from the propulsion engine 200, or more specifically, from the inlet guide vane housing 306. In some embodiments, the multiple segments of the splitter 231 may be assembled together in a lock and key configuration. For example, the segments of the splitter 231 may be cut or created such that an edge of a first segment of the splitter 231 includes a recess, and an edge of a second segment of the splitter 231 includes a protrusion. The recess and protrusion may be designed to engage each other when the splitter 231 is assembled. In other embodiments, one or more bolts, ties, or screws may removably couple the segments of the splitter 231 when the splitter 231 is assembled. It should be appreciated that the splitter 231 may be segmented into any desirable number of segments about the periphery of the propulsion engine 200. By removing one or more segments of the splitter 231, a user can gain access to the otherwise inaccessible components beneath the splitter 231. More specifically, removal of one or more segments of the splitter 231 exposes the inlet guide vane housing 306 beneath the splitter.

The inlet guide vane housing 306 may also be segmented into circumferential sections such that segments of the inlet guide vane housing 306 can be individually removed from the propulsion engine 200. It should be understood that because the inlet guide vanes 240 are coupled to the inlet guide vane housing 306, by removing a segment of the inlet guide vane housing 306, a user simultaneously removes the inlet guide vanes 240 attached to the particular segment from the propulsion engine 200. In some embodiments, the multiple segments of the inlet guide vane housing 306 may be assembled together in a lock and key configuration. For example the segments of the inlet guide vane housing 306 may be cut or created such that an edge of a first segment of the inlet guide vane housing 306 includes a recess, and an edge of a second segment of the inlet guide vane housing 306 includes a protrusion. The recess and protrusion may be designed to engage each other when the inlet guide vane housing 306 is assembled. In other embodiments, one or more bolts, ties, or screws may removably couple the segments of the inlet guide vane housing 306 when the inlet guide vane housing 306 is assembled. It should be appreciated that the guide vane housing 306 may be segmented into any desirable number of segments about the periphery of the propulsion engine 200. By removing one or more segments of the inlet guide vane housing 306, a user will gain access to the otherwise inaccessible components beneath the inlet guide vane housing 306 and inlet guide vanes 240. More specifically, removal of one or more segments of the inlet guide vane housing 306 exposes the flowpath structure 302 beneath the inlet guide vanes 240.

The flowpath structure 302 may also be segmented into circumferential sections such that segments of the flowpath structure 302 can be individually removed from the propulsion engine 200 to provide access panels through the outer engine housing 221. In some embodiments, the multiple segments of the flowpath structure 302 may be assembled together in a lock and key configuration. For example the segments of the flowpath structure 302 may be cut or created such that an edge of a first segment of the flowpath structure 302 includes a recess, and an edge of a second segment of the flowpath structure 302 includes a protrusion. The recess and protrusion may be designed to engage each other when the flowpath structure 302 is assembled. In other embodiments, one or more bolts, ties, or screws may removably couple the segments of the flowpath structure 302 when the flowpath structure 302 is assembled. It should be appreciated that the flowpath structure 302 may be segmented into any desirable number of segments about the periphery of the propulsion engine 200. By removing one or more segments of the flowpath structure 302, a user can gain access to the otherwise inaccessible components beneath the flowpath structure 302. More specifically, removal of one or more segments of the flowpath structure 302 exposes the electric converter 280 within the propulsor cavity 300.

Still referring to FIG. 2, in some embodiments, the forward portion 301 and rear portion 303 of the flowpath structure 302 are fixedly secured as part of an interconnected outer housing structure of the propulsion engine 200. Following removal of segments of the radially outward structures (i.e. splitter 231, inlet guide vane housing 306, and inlet guide vanes 240), segments of the forward portion 301 and rear portion 303 may be removed from the propulsion engine 200 (depicted in FIG. 1). In some embodiments, the flowpath structure 302, or more specifically the rear portion 303, may be integral with or otherwise connected to the inlet guide vanes 240 such that removing a segment of the inlet guide vanes 240 from the propulsion engine 200 also removes segments of the rear portion 303 and forward portion 301 from the propulsion engine 200. In some embodiments, the forward portion 301 and rear portion 303 may be detachably secured at joint 305. Following removal of segments of the radially outward structures (i.e. splitter 231, inlet guide vane housing 306, and inlet guide vanes 240), segments of the forward portion 301 and rear portion 303 may be separately removed from the propulsion engine 200. In some embodiments the rear portion 303, detachable from the forward portion 301, may be fixedly secured to the inlet guide vanes 240. In such embodiments, removing integral segments of the inlet guide vane housing 306 and inlet guide vanes 240 from the propulsion engine 200 also removes a segment of the rear portion 303 from the propulsion engine 200. In other words, segments of the inlet guide vane housing 306, inlet guide vanes 240, and rear portion 303 may be removed from the propulsion engine 200 together. A segment of the forward portion 301 may then be individually removed from the propulsion engine 200. In some embodiments, the splitter 231 may be integral with or fixedly attached to the inlet guide vane housing 306. In other words, one or more segments of the inlet guide vane housing 306 may be fixed to one or more segments of the splitter 231. In such embodiments, removing a segment of the splitter 231 from the propulsion engine 200 will also remove the attached segments of the inlet guide vane housing 306 and inlet guide vanes 240. If the inlet guide vanes 240 are also fixedly attached to the flowpath structure 302, or only its rear portion 303, it becomes possible to integrally and simultaneously remove attached segments of the splitter 231, inlet guide vane housing 306, inlet guide vanes 240, and flowpath structure 302, or the rear portion 303 of the flowpath structure 302.

In some embodiments, the segments of the splitter 231, inlet guide vane housing 306 integral with the inlet guide vanes 240, and flowpath structure 302 may each include the same number and size of segments. More specifically, each component may include two segments having 180 degree arc lengths, four segments having 90 degree arc lengths, six segments having 60 degree arc lengths, and the like. In some embodiments, the number of segments may decrease, and/or the size of the segments may increase from the flowpath structure 302 radially outward to the splitter 231. Such a size increasing arrangement can facilitate a radially inward segment being removed from the opening created in the propulsion engine 200 after the removal of a radially outward segment. As an example, the splitter 231 may include two 180 degree segments, the inlet guide vane housing 306 may include three 120 degree segments, and the flowpath structure 302 (or forward portion 301 and rear portion 303 in embodiments where the portions are not integral) may include four 90 degree segments. These are merely illustrative examples, however, and it should be understood that any arrangement of segments of the splitter 231, inlet guide vane housing 306, and flowpath structure 302 may be desirably achieved.

Referring still to FIG. 2, after removal of one or more segments of the flowpath structure 302, a user can gain access to the components beneath the flowpath structure 302. More specifically, removal of one or more segments of the flowpath structure 302 exposes the electric converter 280. As only segments of the propulsion engine 200 need to be removed to gain access to the electric converter 280, the electric converter 280 can be serviced with the propulsion engine 200 directly on-wing or off-wing. The entire propulsion engine 200 (depicted in FIG. 1) may not need to be removed from the aircraft and disassembled to service the electric converter 280. Instead, the electric converter 280 may be serviced while it is still within the propulsor cavity 300 and the propulsion engine 200 is on-wing. However, if it is desired to remove or replace the electric converter 280, the electric converter 280 may be segmented such that one or more segments of the electric converter 280 may be removed from the propulsion engine 200. The one or more segments of the electric converter 280 may be selectively sized to be removable from the opening in the propulsion engine 200 created by the removal of the radially outward components described above. By segmenting the electric converter 280, removal and servicing one portion or segment of the electric converter 280 is possible, largely obviating any need to remove the entire electric converter 280.

Figure 3A:
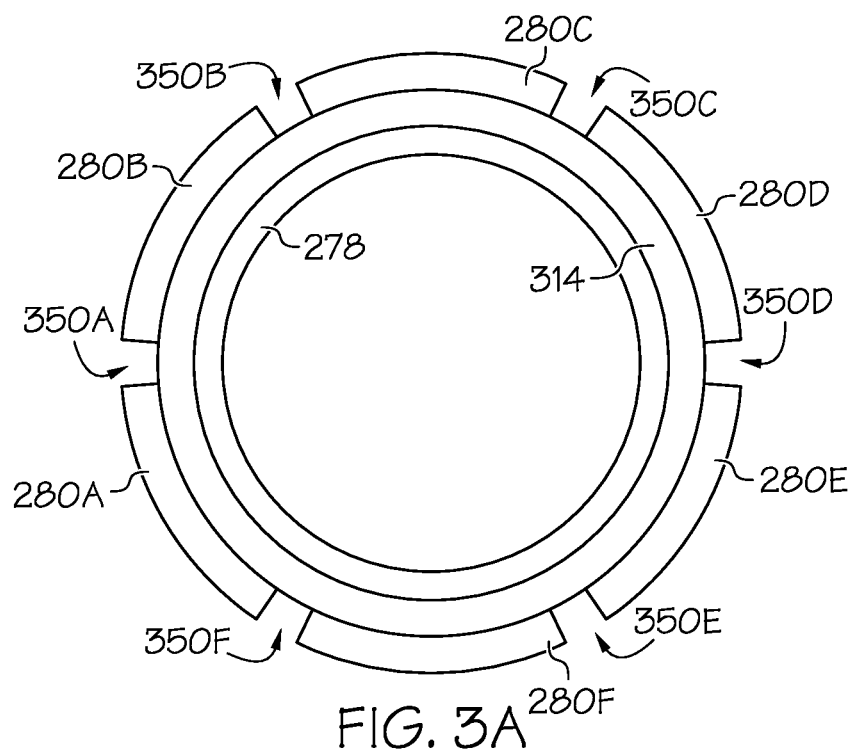
FIG. 3A depicts an axial view of an illustrative electric converter and an electric generator when co-located within the propulsor cavity of FIG. 2, according to one or more embodiments shown and described herein.
Figure 3B:
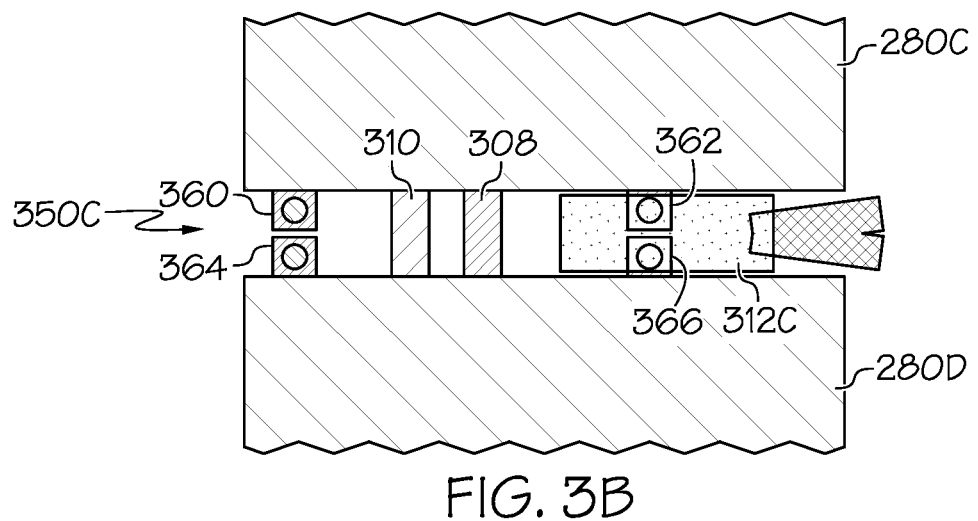
FIG. 3B depicts a radial view of an illustrative electric converter that is located within the propulsor cavity of FIG. 2, according to one or more embodiments shown and described herein.

Reference is now made to FIGS. 2, 3A, and 3B. FIG. 3A depicts an axial view of a segmented electric converter co-located with an electric generator, in accordance with an exemplary embodiment of the present disclosure. FIG. 3B depicts a radial view of a segmented electric converter in accordance with an exemplary embodiment of the present disclosure. The electric converter 280 may include six segments, 280A-280F. In other embodiments, the electric converter can include any desirable number of a plurality of segments. Between the segments 280A-280F of the electric converter are nodes 350A-350F. Service line connections 312 may be attached to the electric converter 280 at all or any of the nodes 350A-350F. The service line connections 312 may include electrical connectors for transmitting electric energy from the electric generator 278 to the electric converter 280, and transmitting the converted electric energy from the electric converter 280 to one or more energy-drawing components on the aircraft and/or propulsion engine 200 (depicted in FIG. 1). The service line connections 312 may also include cooling media line connections for circulating cooling fluid (e.g., oil) throughout the electric converter 280. For example, and without limitation, nodes 350A and 350B may both include electrical connections for the converted energy to be transported to one or more energy-drawing components throughout the aircraft and/or propulsion engine 200 (depicted in FIG. 1), node 350C may include a cooling media inlet, and node 350D may include a cooling media outlet fluidly coupled to the cooling media inlet. One or more internal communications lines may couple the segments of the electric converter 280. For instance, a cooling media line connection 308 may run between all segments of the electric converter 280, providing means (e.g., oil) to cool the electric converter 280 as needed. Additionally, all segments of the electric converter 280 may be communicatively coupled via electrical lines 310. Before removing a segment of the converter 280 from the propulsion engine 200 (depicted in FIG. 1), such as converter segment 280C or 280D, the cooling media line connection 308 and electrical lines 310 may be disconnected between the converter segments 280C and 280D. Moreover, a service line connection 312C depicted in the node 350C may also be detached prior to removal of either converter segment 280C or 280D.

In some embodiments, the electric generator 278, which is electrically coupled to the electric converter 280, is disposed within the propulsor cavity 300, radially inward with respect to the electric converter 280. A generator support structure 314 is disposed between the electric generator 278 and the electric converter 280, co-locating the electric converter 280 and the electric generator 278. At its rear end (in the −z direction of the coordinate axes of FIG. 2), the generator support structure 314 is attached to an engine structure 304. The generator support structure may include one or more openings 316 that allow the stator of the electric generator 278 to be electrically coupled to the electric converter 280. The electric converter 280 is removably attached to the generator support structure 314 via screws, bolts, or other attachment devices. For example, with reference to FIG. 3B specifically, two tabs 360 and 362 may extend from the electric converter segment 280C into the node 350C. Two tabs 364 and 366 are also depicted extending from the electric converter segment 280D into the node 350C. The tabs 360-366 provide fixation points for removably attaching the electric converter segments 280C and 280D to the generator support structure 314. The tabs 360-366 may be designed to receive screws, bolts, or other fixation devices that mate with the generator support structure 314 beneath the tabs 360-366.

After removing one or more segments of the electric converter 280 from the propulsion engine 200 (depicted in FIG. 1), a user can gain access to the generator support structure 314. In some embodiments, the generator support structure 314 is fixedly attached to the electric generator 278. In such embodiments, the one or more openings 316 provide access ports through which a user can inspect or access the electric generator 278. In some embodiments, the generator support structure 314 may be removably attached to the electric generator 278 and the engine structure 304. The generator support structure 314 may be segmented such that one or more segments of the generator support structure 314 may be removed from the propulsion engine 200, providing a user direct access to the electric generator 278.

Figure 4:
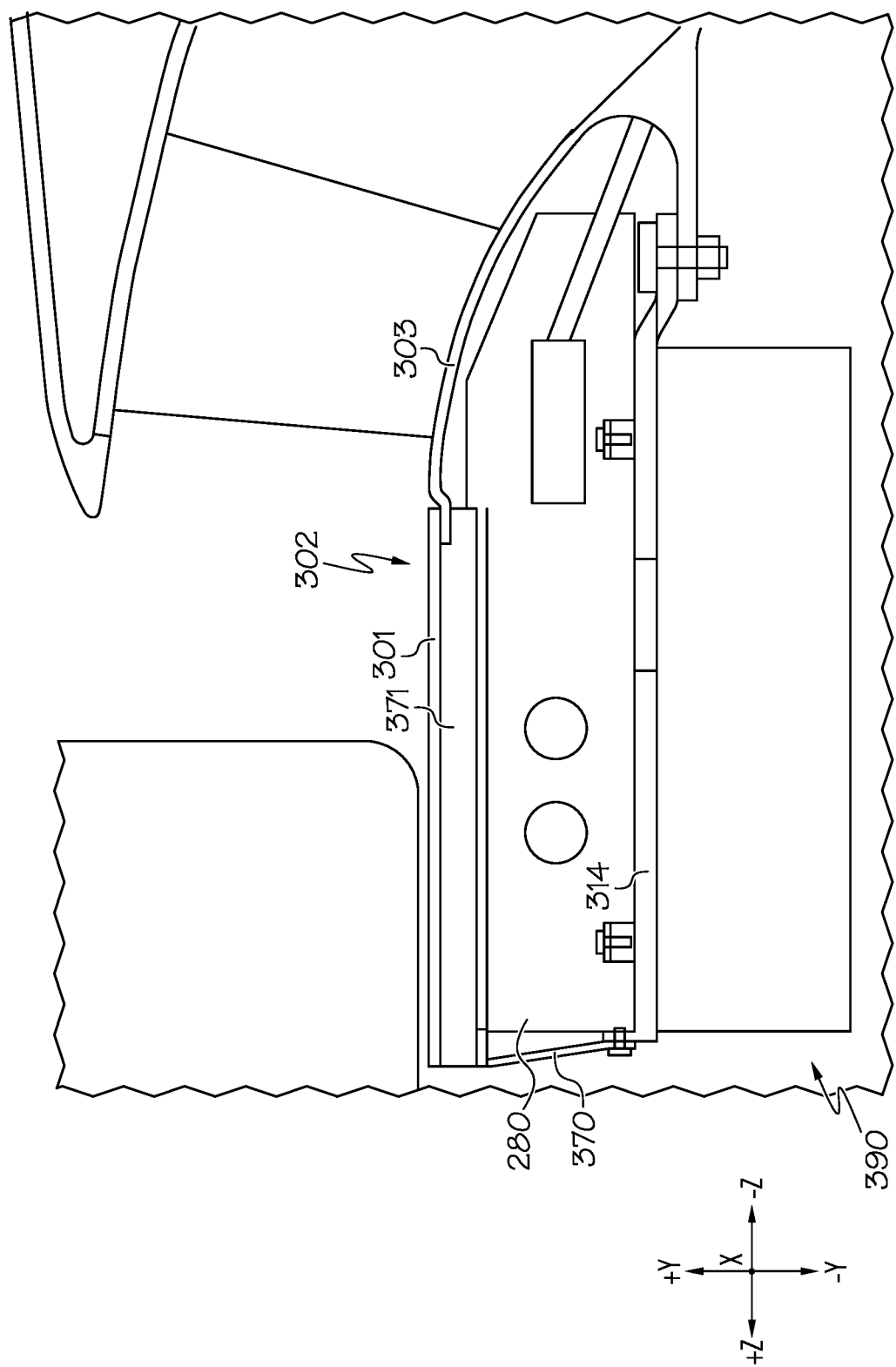
FIG. 4 depicts a cross sectional view of an illustrative supporting rib of the propulsor cavity of FIG. 2, according to one or more embodiments shown and described herein.

Referring now to FIG. 4, a cross sectional view of a propulsor cavity 390 of a propulsion engine in accordance with an exemplary embodiment of the present disclosure is provided. The propulsor cavity 390 may be the same as the propulsor cavity 300 (depicted in FIG. 2) in all respects except as discussed below. In some embodiments, the flowpath structure 302 of the propulsor cavity 390 is further supported by one or more supporting or reinforcement ribs, such as supporting rib 371. The supporting rib 371 is integral with the radial inward surface of the flowpath structure 302. The supporting rib 371 may extend the entire axial length (in the z direction of the coordinate axes of FIG. 4) of the flowpath structure 302. Multiple supporting ribs may be attached to the flowpath structure 302 along the interior circumference, or radially inward surface, of the flowpath structure 302. In some embodiments, the supporting rib 371 may be self-supporting. In other embodiments, the supporting rib 371 may be supported by support arm 370. A distal end of the support arm 370 contacts the radially inward surface of the supporting rib 371, and may be attached thereto with any suitable fixation device, such as bolts, ties, or the like. In other embodiments, the distal end of the support arm 370 may be attached directly to the flowpath structure 302 without the supporting rib 371 between the support arm 370 and the flowpath structure 302. A proximal end of the support arm 370 is attached to the generator support structure 314 with any suitable fixation device, such as bolts, ties, or the like. For instance, the support arm 370 may be positioned at a node or opening between two segments of the electric converter 280. As such, the electric converter 280 does not interfere with the support arm 370 extending from the generator support structure 314 to the supporting rib 371. In other embodiments, the proximal end of the support arm 370 is attached to the radially outward surface of the electric converter 280 with any suitable fixation device, such as bolts, ties, or the like. These are merely examples, however, and it should be understood that the proximal end of the support arm 370 may be attached to any solid surface that provides the support arm 370 with sufficient footing to avoid compressing or collapsing under the weight of the flowpath structure 302 and/or supporting rib 371. The flowpath structure 302 and/or supporting rib 371 may be supported by a plurality of support arms 370. In other embodiments, the flowpath structure 302 and/or supporting rib 371 may be supported by a single, continuous support arm 370 that spans the entire interior circumference of the flowpath structure 302, forward (in the +z direction of the coordinate axes of FIG. 4) of the electric converter 280, so as to allow for removal of the electric converter 280 from the propulsion engine 200 (depicted in FIG. 1). The support arm 370 functions to provide additional structural support to the forward end of the flowpath structure 302 and/or supporting rib 371 (e.g. in the +z direction of the coordinate axes of FIG. 4), which in some embodiments, may be otherwise free hanging over the propulsor cavity 390.

Figure 5:
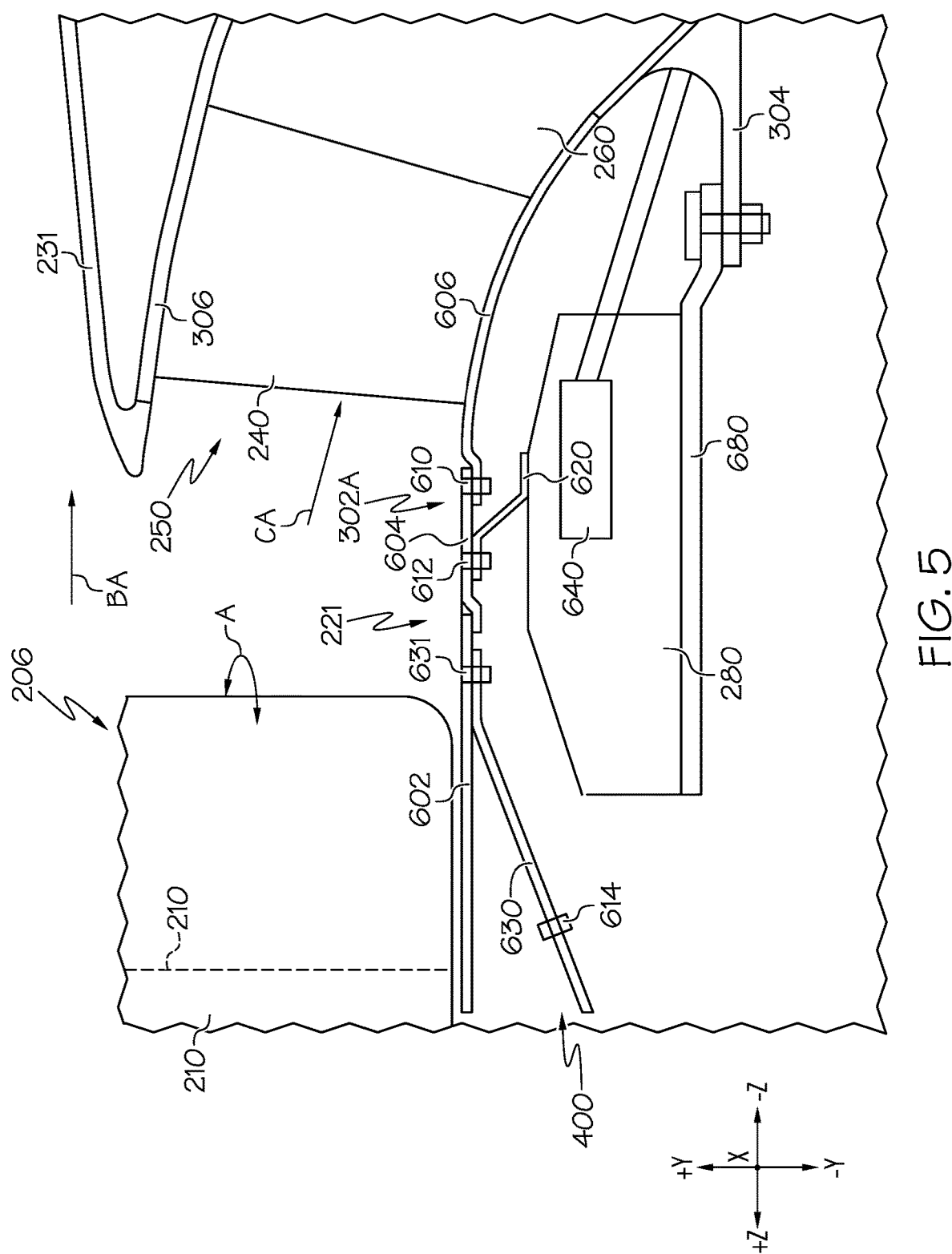
FIG. 5 depicts a cross sectional view of an illustrative propulsor cavity having an electric converter therein that is electrically coupled to an electric generator located outside of the propulsor cavity, according to one or more embodiments shown and described herein.

Referring now to FIG. 5, a cross sectional view of another propulsor cavity 400 of a propulsion engine in accordance with an exemplary embodiment of the present disclosure is provided. The propulsor cavity 400 may be located within the propulsion engine 200 (depicted in FIG. 1). The propulsor cavity 400 is axially defined (e.g. in the z direction of the coordinate axes of FIG. 5) between the low-pressure compressor 260 and the first rotor assembly, or fan 206. The propulsor cavity 400 is disposed radially inside an outer engine housing 221, such as a nacelle, and radially outside the shaft 274. The inlet 250 circumferentially surrounds at least a portion of the propulsor cavity 400. In some embodiments, the propulsor cavity 400 may be radially within the flowpath structure 302A or another engine structure, such that the flowpath structure 302A or another engine structure circumferentially surrounds at least a portion of the propulsor cavity 400. As explained above, the inlet 250 is the entrance point for the air that makes up the core airflow CA to enter the core of the propulsion engine. The inlet 250 may include at least a portion of the splitter 231, the inlet guide vanes 240, the inlet guide vane housing 306, and/or the flowpath structure 302A, all of which at least partially define the entrance pathway for the core airflow CA to enter the core of the propulsion engine. Therefore, with reference to FIGS. 1 and 5, the propulsor cavity 400 is generally positioned toward the forward end 292 of the propulsion engine 200. As such, the propulsor cavity 400 is spaced-apart from the high-pressure compressor 262 and the combustion section 264, effectively shielding the interior of the propulsor cavity 400 from the high temperatures and pressures generated deeper (in the -z direction of the coordinate axes of FIGS. 1 and 5) in the propulsion engine 200.

Unlike the embodiment depicted by FIG. 2, the electric generator is not positioned within the propulsor cavity 400. In other words, the electric converter 280 is not co-located with the electric generator and is located spaced from the propulsor cavity 400. The electric generator may be positioned in any suitable location on the aircraft or propulsion engine 200 (depicted in FIG. 1) outside the propulsor cavity 400, as depicted by the example electric generator 278A in FIG. 1. The electric generator 278A remains electrically coupled to the electric converter 280 by means of one or more electrical conductors. As the electric generator 278A is not housed within the propulsor cavity 400, the propulsor cavity 400 may not include a generator support structure as described herein with respect to FIGS. 2 and 3A. The electric converter 280, however, remains within the propulsor cavity 400, and may be supported by a converter support structure 680. The converter support structure 680 may be secured to the engine structure 304. The electric converter 280 may be detachably secured to the converter support structure 680 by means of bolts or other fasteners thereby supporting the electric converter 280 within the propulsor cavity 400. The splitter 231, inlet guide vane housing 306, and inlet guide vanes 240 may function as described with reference to FIGS. 1 and 2 and thus are not further described herein with respect to the embodiment of FIG. 5. The splitter 231, the inlet guide vane housing 306, and the inlet guide vanes 240 may also be segmented as described with reference to FIGS. 1 and 2. However, as will be explained below, in some embodiments, the splitter 231, inlet guide vane housing 306, and inlet guide vanes 240 of the propulsor cavity 400 may not be segmented.

The flowpath structure 302A axially extends (e.g. in the z direction of the coordinate axes of FIG. 5) from the inlet guide vanes 240 to the blade 210 of the first rotor assembly 206. Flowpath structure 302A may also be segmented into circumferential sections such that segments of the flowpath structure 302A can be individually removed from the propulsion engine 200 (depicted in FIG. 1). In some embodiments, the multiple segments of the flowpath structure 302A may be assembled together in a lock and key configuration. In other embodiments, one or more bolts, ties, or screws may removably couple the segments of the flowpath structure 302A when the flowpath structure 302A is assembled. It should be appreciated that the flowpath structure 302A may be segmented into any desirable number of segments about the periphery of the propulsion engine. By removing one or more segments of the flowpath structure 302A, a user will gain access to the otherwise inaccessible components beneath the flowpath structure 302A. More specifically, removal of one or more segments of the flowpath structure 302A exposes the electric converter 280.

The flowpath structure 302A is further segmented into axial segments 602, 604, and 606. Segment 606 is positioned radially inward of the inlet guide vanes 240, inlet guide vane housing 306, and splitter 231, and generally at the same longitude (e.g. the z direction of the coordinate axes of FIG. 5) as the inlet guide vanes 240, inlet guide vane housing 306, and splitter 231. In some embodiments, the inlet guide vanes 240, inlet guide vane housing 306, and splitter 231 are not segmented, and are therefore not removable from the propulsion engine 200 (depicted in FIG. 1). In such embodiments, the segment 606 of the flowpath structure 302A may not be removable from the propulsion engine 200. Further, in such embodiments, the segment 606 of the flowpath structure 302A may be fixedly secured to the inlet guide vanes 240, and therefore to the inlet guide vane housing 306.

The segment 604 of the flowpath structure 302A is adjacent to and positioned forward of (in the +z direction of the coordinate axes of FIG. 5) the segment 606. The segment 604 and the segment 606 may be detachably joined by bolts, split joints, or other fixation device 610. At its forward end, the segment 604 may include a reduced region designed to rest beneath the rear end (in the -z direction of the coordinate axes of FIG. 5) of the segment 602. In other words, the rear end of the segment 602 is designed to overlap the forward end of the segment 604. In some embodiments, the segment 604 may be further supported by a support arm 620. The distal end of the support arm 620 may be detachably joined to the radially inward surface of the segment 604 via fixation device 612. The proximal end of the support arm 620 may be fixedly attached to the surface of the electric converter 280, thereby providing additional structural support to the segment 604, and specifically to the forward end of the segment 604 that would otherwise be free hanging without the support arm 620. By detaching the fixations devices 610 and 612, the segment 604 can then be removed from the propulsion engine 200 (depicted in FIG. 1).

The segment 602 of the flowpath structure 302A is adjacent to and positioned forward (e.g. in the +z direction of the coordinate axes of FIG. 5) of the segment 604. As described, the rear end of the segment 602 overlaps the forward end of the segment 604. The forward end of the segment 602 extends to the fan blade 210 of the first rotor assembly 206 (depicted in FIG. 1). The segment 602 may be supported by a support arm 630. A proximal end of the support arm 630 may be fixedly attached to a radially inward surface of the first rotor assembly 206 or any other suitable radially inward surface of the propulsor cavity 400. A distal end of the support arm 630 may be detachably secured to the radially inward surface of the segment 602 at fixation device 631, providing structural support to the segment 602. The support arm 630 may further include an internal bolt or split joint 614. Following detachment of the fixation device 631, the segment 602 can be removed from the propulsion engine 200 (depicted in FIG. 1). After removal of the segment, 602, the split joint 614 allows the distal portion of the support arm 630 to be removed from the propulsion engine 200, while the proximal portion of the support arm 630 remains fixed to the radially inward surface of the first rotor assembly 206.

The configuration of the segmented flowpath structure 302A described above allows access to the electric converter 280 with removal of relatively few propulsion engine components. For instance, the splitter 231, inlet guide vane housing 306, inlet guide vanes 240, and segment 606 need not be removed from the propulsion engine 200 (depicted in FIG. 1) to access the electric converter 280. Instead, one or both of the segments 602 and 604 may be removed to provide a user with access to the electric converter 280. The user may also remove the electric converter 280 from the propulsion engine 200 after only removal of the segments 602 and 604. Because the propulsor cavity 400 does not also include the electric generator 278A (depicted in FIG. 1) within, the increased space within the propulsor cavity 400 allows the electric converter 280 to be angled or rotated prior to and during removal of the electric converter 280 from the propulsor cavity 400 and propulsion engine 200. In other words, a user can simultaneously alter the orientation of the electric converter 280 and remove it from the propulsion engine 200. This enables a forward edge of the electric converter 280 to be the leading edge of the electric converter 280 as it is removed from the propulsion engine 200.

Still referring to FIG. 5, the electric converter 280 includes service lines 640. The service lines 640 may supply and remove cooling media (e.g., oil) that is circulated throughout the electric converter 280. The service lines 640 may also include electrical connections. The electrical connections may couple the electric generator 278A positioned outside of the propulsor cavity 400 with the electric converter 280, thereby providing electric power from the electric generator 278A to the electric converter 280. The electrical connections may also include connections to any desirable portions of the aircraft and/or propulsion engine 200 (depicted in FIG. 1) that require power, thereby delivering the converted electric power from the electric converter 280 to components drawing power throughout the aircraft and/or propulsion engine 200. Prior to removal of the electric converter 280 from the propulsion engine 200 (depicted in FIG. 1), a user may disconnect the service lines 640 from the electric converter 280.

In some embodiments, the arrangements described with respect to FIGS. 3A and 3B may be adapted for use with propulsor cavity 400 depicted in FIG. 5. More specifically, the electric converter 280 of FIG. 5 may be segmented, with each segment attached to the radially inward converter support structure 680. In other words, the configuration depicted in FIG. 3A, when adapted for use in the propulsor cavity 400 of FIG. 5, does not include the electric generator 278 and includes the converter support structure 680 in place of the generator support structure 314 depicted in FIG. 3A. Nodes 350A-350F may similarly exist between segments of the electric converter 280 of FIG. 5. Turning now to FIG. 3B in conjunction with FIG. 5, the segments of the electric converter 280 of FIG. 5 may be communicatively coupled via electrical lines 310 and cooling media line connection 308. Service lines 640 depicted in FIG. 5 may couple to the electric converter 280 between any two segments of the electric converter 280. For example, the service lines 640 depicted in FIG. 5 may couple to the electric converter 280 at any of nodes 350A-350F. The segments of the electric converter 280 of FIG. 5 may further include tabs, such as tabs 360-366 depicted in FIG. 3B, which provide points for removably coupling the segments of the electric converter 280 to the converter support structure 680.

Figure 6:
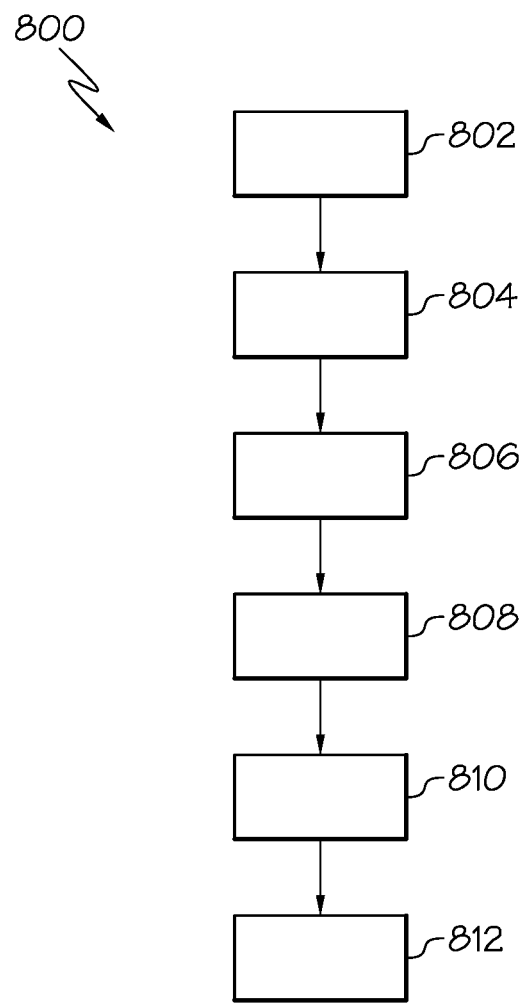
FIG. 6 schematically depicts a block diagram of an illustrative method of accessing an electric converter disposed within a propulsor cavity, according to one or more embodiments shown and described herein.

Referring now to FIG. 6 a schematic illustration of a method of accessing an electric converter in accordance with an exemplary embodiment of the present disclosure is provided. The method 800 can be completed on-wing or off-wing. While the specific design of the propulsion engine 200 (depicted in FIG. 1) and propulsor cavities described above offer the benefit of being able to access and service the electric converter on-wing, the same method may be used to access and service the electric converter when the propulsion engine 200 is off-wing. At a first step 802 of method 800, a user removes at least one segment of the segmented splitter. The splitter defines the boundary between the core airflow and the bypass airflow. Airflow beneath the splitter comprises the core airflow and is directed toward the low-pressure compressor. Airflow above the splitter comprises bypass airflow.

At step 804 of method 800, one or more fan blades disposed forward of a segmented inlet guide vane are rotated away from the segmented inlet guide vanes. In a nominal, or standard operating, position, the one or more fan blades may overlap or extend over at least a portion of a flowpath structure. The fan blades may have a variable pitch. Referring briefly to FIG. 5, the one or more fan blades 210 of the rotor assembly 206 may be rotated forward in the direction of arrow A about a long axis of each one of the fan blades 210 thereby changing the pitch of the blades 210 and exposing the flowpath structure, as represented by the dashed line. Alternatively or in addition, the fan blades may be rotated by the engine thrust axis to provide access to the desired flowpath structure segment.

Referring again to FIG. 6, at step 806 of the method 800, one or more segments of the segmented inlet guide vanes are removed from the propulsion engine. Following removal of one or more segments of the splitter, one or more segments of the inlet guide vane housing, which is integral with the inlet guide vanes, may be accessed. Therefore, removing a segment of the inlet guide vane housing results in the simultaneous removal of the inlet guide vanes attached to that particular segment of the inlet guide vane housing. Removal of the inlet guide vanes and inlet guide vane housing exposes the flowpath structure. For embodiments where a portion of the flowpath structure is integral with the inlet guide vanes, removal of the integral segments of the inlet guide vane housing and inlet guide vanes results in simultaneous removal of the portion of the flowpath structure integral with the inlet guide vanes.

At step 808 of the method 800, one or more segments of the flowpath structure are removed from the propulsion engine. Following the rotation of the fan blades at step 804 and the removal of one or more segments of the splitter, inlet guide vane housing, and inlet guide vanes at steps 802 and 806, the flowpath structure may be radially exposed. In other words, there are no other components of the propulsion engine positioned radially outward the flowpath structure. Therefore, one or more segments of the flowpath structure may be removed from the propulsion engine.

It should be appreciated that in steps 802-808 the portions of the propulsion engine selected for removal or rotation are at least partially aligned to a create a continuous void or path of access radially throughout the propulsion engine and propulsor cavity. By way of example, the one or more segments of the flowpath structure removed at step 808 may be at least partially aligned with the one or more blades rotated forward at step 804 and the one or more segments of the splitter, inlet guide vanes, and inlet guide vane housing removed at steps 802 and 806. This allows the one or more selected segments of the flowpath structure to be removed through the opening created by the removal and repositioning of components prior to the removal of the one or more flowpath structure segments. Simultaneously, the partial alignment of the removed and rotated components of the propulsion engine can maintain a continuous opening that allows a user to further access the electric converter.

At step 810 of method 800, the electric converter may be accessed or serviced. As discussed above, in some embodiments, a user may directly service the electric converter on-wing. In other words, the electric converter may be maintained in the propulsor cavity and propulsion engine as it is inspected, repaired, or the like. In other embodiments, the user may wish to remove the electric converter from the propulsion engine in order to replace the part, for instance. In such embodiments, one or more segments of a segmented electric converter may be removed from the propulsion engine.

At an additional step 812 of method 800, the electric generator may be serviced or accessed. After removal of one or more segments of the electric converter, a generator support structure is exposed. In some embodiments, the generator support structure comprises one or more openings in a surface of the generator support structure that allow a user to access and inspect the electric generator through the generator support structure. In other embodiments, the generator support structure may be segmented to allow for one or more segments of the generator support structure to be removed from the from the propulsion engine, thereby allowing greater access to the electric generator.

It should be appreciated that the method 800 discussed above is not limited to the order of steps presented in FIG. 6. For example, the first fan blade may be rotated forward at step 804 thereby changing the pitch of the first fan blade to expose the desired flowpath structure segment prior to the removal a segment of the splitter at step 802. It should also be appreciated that one or more steps of the method 800 can be completed simultaneously. For example, in some embodiments, the inlet guide vanes may be integral with portions of the flowpath structure. In such embodiments, steps 806 and 808 may be completed simultaneously, as the inlet guide vane housing, the inlet guide vanes, and the flowpath structure may be integrally and simultaneously removed from the propulsion engine. It should further be appreciated that the method may include additional steps depending on the specific propulsion engine architecture implemented.

It should now be understood that that the devices, systems, and methods described herein provide an electric converter located within a propulsor cavity of a propulsion engine where the heat experienced by the electric converter may be limited, maintaining the efficacy of the electric converter over its lifetime. The electric converter may be easily accessed when the propulsion engine is on-wing or off-wing. The specific design of the propulsion engine and the propulsor cavity make it feasible to quickly remove small portions or segments of the propulsion engine to provide access to the electric converter to service, inspect, or replace the converter.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an end-point of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or end-points defining range(s) of values.

Directional terms as used herein—for example up, down, right, left, front, back, top, bottom—are made only with reference to the figures as drawn and are not intended to imply absolute orientation.

Where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Further aspects of the invention are provided by the subject matter of the following clauses: 1. A propulsion engine comprising: an outer engine housing that includes a propulsor cavity located therein, the propulsor cavity axially located between a low-pressure compressor and a fan of the propulsion engine; and an electric converter disposed within the propulsor cavity.

2. The propulsion engine of any preceding clause, wherein the propulsion engine is a propfan or a turbofan.

3. The propulsion engine of any preceding clause, wherein the propulsion engine is a propfan that is configured for a below-wing installation or an installation on an empennage of an aircraft.

4. The propulsion engine of any preceding clause, wherein the outer engine housing comprises a flowpath structure segment that is removable to access the propulsor cavity through a perimeter of the outer engine housing.

5. The propulsion engine of any preceding clause, further comprising an electric machine electrically coupled to the electric converter.

6. The propulsion engine of any preceding clause, wherein the electric machine is disposed within the propulsor cavity.

7. The propulsion engine of any preceding clause, further comprising an electric machine electrically coupled to the electric converter.

8. The propulsion engine of any preceding clause, wherein the electric machine is disposed within the propulsor cavity.

9. The propulsion engine of any preceding clause, further comprising a support structure disposed at least partially between the electric converter and the electric machine within the propulsor cavity; wherein: the electric converter is removably attached to the support structure; and the support structure is fixedly attached to the electric machine, or the support structure is segmented such that a segment of the support structure may be removed from the propulsion engine.

10. The propulsion engine of any preceding clause, wherein the support structure comprises an opening in a surface of the support structure, wherein the opening exposes at least a portion of the electric machine.

11. The propulsion engine of any preceding clause, wherein the electric machine is disposed outside the propulsor cavity and one or more electrical conductors extend from the propulsor cavity to the electric machine to electrically couple the electric converter to the electric machine.

12. The propulsion engine of any preceding clause, further comprising: an inlet guide vane disposed behind the first fan and radially outward of a flowpath structure; and a splitter disposed radially outward of the inlet guide vane, wherein: the flowpath structure is segmented, wherein the flowpath structure is contoured to provide an airflow to the inlet guide vane; the inlet guide vane is segmented, wherein the inlet guide vane directs the airflow to the low-pressure compressor; the splitter is segmented, wherein the splitter defines an outer boundary of a core airflow and an inner boundary of a bypass airflow; and a segment of the flowpath structure and a segment of the inlet guide vane and a segment of the splitter may be removed from the propulsion engine, wherein the segment of the inlet guide vane and the segment of the flowpath structure and the segment of the splitter at least partially align, such that at least a portion of the electric converter is exposed following removal of the segment of the inlet guide vane and the segment of the flowpath structure and the segment of the splitter.

13. The propulsion engine of any preceding clause, wherein: at least a portion of the flowpath structure is coupled to the inlet guide vane; and a segment of the portion of the flowpath structure coupled to the inlet guide vane and the segment of the inlet guide vane may be integrally removed from the propulsion engine.

14. The propulsion engine of any preceding clause, further comprising reinforcement ribs supporting the flowpath structure, the reinforcement ribs axially extending along a radial inward surface of the flowpath structure.

15. The propulsion engine of any preceding clause, wherein the propulsor cavity further comprises: a surface disposed radially inward of the flowpath structure; and a support arm extending radially outward from the surface, the support arm comprising a distal end that radially supports the flowpath structure.

16. The propulsion engine of any preceding clause, wherein the electric converter is an AC/DC converter, a DC/AC converter, or a DC/DC converter.

17. The propulsion engine of any preceding clause, wherein the first fan is driven by a gearbox or is a direct drive mechanism. 18. A method of accessing an electric converter disposed within a propulsor cavity within a propulsion engine, the method comprising: first, accessing the electric converter including rotating one or more fan blades; and second, removing at least a portion of an outer engine housing, thereby exposing the electric converter within the propulsor cavity.

19. The method of any preceding clause, wherein the propulsion engine is a variable pitch engine and the step of rotating comprises rotating the one or more fan blades forward with respect to the outer engine housing 20. The method of any preceding clause, wherein the portion of the outer engine housing is a flowpath structure segment.

21. The method of any preceding clause, further comprising: removing at least a portion of a segmented splitter, thereby exposing the segmented inlet guide vane disposed radially inward of the segmented splitter; and removing at least a portion of the segmented inlet guide vane.

22. The method of any preceding clause, wherein: at least a portion of the segmented flowpath structure and the segmented inlet guide vane are coupled; and the portion of the segmented inlet guide vane and the portion of the segmented flowpath structure may be integrally removed.

23. The method of any preceding clause, further comprising: disconnecting one or more electrical connectors or one or more cooling media connectors from the electric converter; and removing the electric converter from the propulsor cavity.

24. The method of any preceding clause, wherein the electric converter is accessed within the propulsor cavity while the propulsion engine is attached to an aircraft.

25. A propulsion engine, comprising: a propulsor cavity radially within an inlet of the propulsion engine and axially defined between a low-pressure compressor and a first fan of the propulsion engine; an electric converter disposed within the propulsor cavity; a flowpath structure shaped to provide a core airflow to an inlet guide vane; and a splitter disposed radially outward of the inlet guide vane, the splitter defining an outer boundary of the core airflow and an inner boundary of a bypass airflow; wherein the inlet guide vane is disposed behind the first fan, wherein the inlet guide vane directs the core airflow to the low-pressure compressor; and the inlet guide vane, the splitter, and the flowpath structure are segmented such that at least partially aligning segments of the inlet guide vane, the splitter, and the flowpath structure may be removed from the propulsion engine to expose at least a portion of the electric converter.

26. The propulsion engine of any preceding clause, further comprising: an electric machine disposed within the propulsor cavity and electrically coupled to the electric converter; and a support structure disposed at least partially between the electric converter and the electric machine within the propulsor cavity; wherein: the support structure is fixedly attached to the electric machine; and the electric converter is removably attached to the support structure.

27. The propulsion engine of any preceding clause, further comprising: an electric machine disposed outside of the propulsor cavity and electrically coupled to the electric converter.

28. A propulsion engine comprising: an electric converter; a core comprising a compressor and combustion portions;

and an electric machine coupled to the electric converter; wherein the electric converter is disposed proximal an inlet to the core and distal of the electric machine.

29. The propulsion engine of and preceding clause, wherein the electric machine is located one of aft of the core, between the core and an outer engine housing, or external of the outer engine housing.

30. The propulsion engine of any preceding clause, wherein the propulsion engine is one of a propfan or a turbofan.

31. The propulsion engine of any preceding clause further comprising an outer engine housing comprising a flowpath structure segment that is removable to access the propulsor cavity through a perimeter of the outer engine housing.

32. The propulsion engine of any preceding clause further comprising a plurality of flowpath structure segments arranged circumferentially about a perimeter of the outer engine housing, the plurality of flowpath structure segments providing access the propulsor cavity through the perimeter of the outer engine housing.

33. The propulsion engine of any preceding clause, wherein the flowpath structure segment is coupled to a splitter, the flowpath structure segment and the splitter forming a portion of the inlet.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A propulsion engine comprising:
an outer engine housing that includes a propulsor cavity located therein, the propulsor cavity axially located between a low-pressure compressor and a fan of the propulsion engine, the outer engine housing including a flowpath structure segment that is removable to access the propulsor cavity through a perimeter of the outer engine housing; and
an electric converter disposed within the propulsor cavity;
wherein removal of the flowpath structure segment provides direct access to the electric converter within the propulsor cavity.

2. The propulsion engine of claim 1, wherein the propulsion engine is a propfan or a turbofan.

3. The propulsion engine of claim 1, wherein the propulsion engine is a propfan that is configured for a below-wing installation or an installation on an empennage of an aircraft.

4. The propulsion engine of claim 1, further comprising an electric machine electrically coupled to the electric converter.

5. The propulsion engine of claim 4, wherein the electric machine is disposed within the propulsor cavity.

6. The propulsion engine of claim 4, wherein the electric machine is disposed outside the propulsor cavity and one or more electrical conductors extend from the propulsor cavity to the electric machine to electrically couple the electric converter to the electric machine.

7. The propulsion engine of claim 1, wherein:
the flowpath structure segment comprises a plurality of flowpath structure segments positioned circumferentially about the perimeter of the outer engine housing;
the electric converter includes a plurality of electric converter segments positioned circumferentially about the perimeter of the outer engine housing; and
removal of one or more of the plurality of flowpath structure segments provides direct access to one or more of the plurality of electric converter segments.

8. The propulsion engine of claim 1, further comprising:
a support structure disposed within the propulsor cavity, wherein the electric converter is removably coupled to the support structure; and
at least one support arm coupled between the flowpath structure segment and the support structure.

* * * * *